US 9,525,638 B2

(12) United States Patent
Valero et al.

(10) Patent No.: US 9,525,638 B2
(45) Date of Patent: Dec. 20, 2016

(54) ROUTING SYSTEM FOR INTERNET TRAFFIC

(71) Applicant: Internap Network Services Corporation, Atlanta, GA (US)

(72) Inventors: Marco A. Valero, Atlanta, GA (US); Charles Victor Bancroft, II, Bishop, GA (US); William Brian Hammond, Marietta, GA (US); Adam S. Rothschild, Stone Mountain, GA (US); Charles R. Gwyn, IV, Marietta, GA (US); Christopher B. Freas, Marietta, GA (US); Gilbert L. Shillcutt, Atlanta, GA (US); Michael William Palladino, Marietta, GA (US)

(73) Assignee: Internap Corporation, Atlanta, GA (US)

( * ) Notice: Subject to any disclaimer, the term of this patent is extended or adjusted under 35 U.S.C. 154(b) by 121 days.

(21) Appl. No.: 14/081,601

(22) Filed: Nov. 15, 2013

(65) Prior Publication Data
US 2015/0103662 A1 Apr. 16, 2015

Related U.S. Application Data

(60) Provisional application No. 61/891,196, filed on Oct. 15, 2013.

(51) Int. Cl.
*H04L 12/851* (2013.01)
*H04L 12/26* (2006.01)
(Continued)

(52) U.S. Cl.
CPC ....... *H04L 47/2441* (2013.01); *H04L 43/0829* (2013.01); *H04L 43/0852* (2013.01);
(Continued)

(58) Field of Classification Search
CPC .. H04L 43/0876; H04L 45/123; H04L 45/124; H04L 45/125; H04L 45/70; H04L 47/2441
(Continued)

(56) References Cited

U.S. PATENT DOCUMENTS 4,095,055 A 6/1978 Gotoh et al.
4,408,323 A 10/1983 Montgomery
(Continued)

FOREIGN PATENT DOCUMENTS

EP 0 488 706 A1 11/1991
EP 0 488 706 B1 11/1991
(Continued)

OTHER PUBLICATIONS

On Path Selection for Traffic with Bandwidth Guarantees, by Peter Steenkiste, Carnegie Mellon University, Pittsburgh, PA 15213 (1997).
(Continued)

*Primary Examiner* — Chi H Pham
*Assistant Examiner* — Robert Lopata
(74) *Attorney, Agent, or Firm* — Warner Norcross & Judd LLP

(57) ABSTRACT

A deterministic approach for route selection in the Internet and other multi-homed networks is presented that is based upon a mathematical model that takes into consideration performance and costs while satisfying commitment constraints. The approach is expressed with a linear programming formulation that can be solved with conventional linear programming solver software. Performance metrics can be defined and combined in order to achieve the best route selection depending on requirements. Some of the potential benefits of the approach include: a global optimal solution for routing traffic (using metrics such as performance, cost, and other constraints), a dynamic weight
(Continued)

assignment for performance metrics, and a flexible problem definition to add routing rules (e.g. static and restricted routes) to the model.

10 Claims, 5 Drawing Sheets

(51) Int. Cl.
H04L 12/729 (2013.01)
H04L 12/721 (2013.01)
H04L 12/715 (2013.01)

(52) U.S. Cl.
CPC .............. H04L 45/70 (2013.01); *H04L 45/04* (2013.01); *H04L 45/124* (2013.01); *H04L 45/125* (2013.01)

(58) Field of Classification Search
USPC ................................................. 370/229, 235
See application file for complete search history.

(56) References Cited

U.S. PATENT DOCUMENTS

| | | |
|---|---|---|
| 4,475,192 A | 10/1984 | Fernow et al. |
| 4,484,326 A | 11/1984 | Turner |
| 4,527,267 A | 7/1985 | Cohen |
| 4,672,632 A | 6/1987 | Andersen |
| 4,791,665 A | 12/1988 | Bogart et al. |
| 4,866,601 A | 9/1989 | DuLac et al. |
| 4,905,233 A | 2/1990 | Cain et al. |
| 4,967,345 A | 10/1990 | Clarke et al. |
| 4,979,118 A | 12/1990 | Kheradpir |
| 5,032,833 A | 7/1991 | Laporte |
| 5,088,032 A | 2/1992 | Bosack |
| 5,142,531 A | 8/1992 | Kirby |
| 5,146,454 A | 9/1992 | Courtois et al. |
| 5,164,938 A | 11/1992 | Jurkevich et al. |
| 5,168,572 A | 12/1992 | Perkins |
| 5,173,933 A | 12/1992 | Jabs et al. |
| 5,179,550 A | 1/1993 | Simpson |
| 5,199,027 A | 3/1993 | Barri |
| 5,210,742 A | 5/1993 | Barri et al. |
| 5,231,649 A | 7/1993 | Duncanson |
| 5,233,604 A | 8/1993 | Ahmadi et al. |
| 5,274,625 A | 12/1993 | Derby et al. |
| 5,280,483 A | 1/1994 | Kamoi et al. |
| 5,307,413 A | 4/1994 | Denzer |
| 5,317,562 A | 5/1994 | Nardin et al. |
| 5,317,566 A | 5/1994 | Joshi |
| 5,337,352 A | 8/1994 | Kobayashi et al. |
| 5,343,463 A | 8/1994 | van Tetering et al. |
| 5,347,511 A | 9/1994 | Gun |
| 5,371,732 A | 12/1994 | Brocken et al. |
| 5,388,101 A | 2/1995 | Dinkins |
| 5,400,395 A | 3/1995 | Berenato |
| 5,402,478 A | 3/1995 | Hluchyj et al. |
| 5,406,643 A | 4/1995 | Burke et al. |
| 5,425,085 A | 6/1995 | Weinberger et al. |
| 5,426,645 A | 6/1995 | Haskin |
| 5,434,848 A | 7/1995 | Chimento, Jr. et al. |
| 5,440,547 A | 8/1995 | Easki et al. |
| 5,452,294 A | 9/1995 | Natarajan |
| 5,452,306 A | 9/1995 | Turudic et al. |
| 5,467,343 A | 11/1995 | Lee et al. |
| 5,490,258 A | 2/1996 | Fenner |
| 5,491,690 A | 2/1996 | Alfonsi et al. |
| 5,517,620 A | 5/1996 | Hashimoto et al. |
| 5,521,910 A | 5/1996 | Matthews |
| 5,530,909 A | 6/1996 | Simon et al. |
| 5,535,195 A | 7/1996 | Lee |
| 5,535,334 A | 7/1996 | Merkley et al. |
| 5,546,452 A | 8/1996 | Andrews et al. |
| 5,550,820 A | 8/1996 | Baran |
| 5,559,800 A | 9/1996 | Mousseau et al. |
| 5,568,471 A | 10/1996 | Hershey et al. |
| 5,586,121 A | 12/1996 | Moura et al. |
| 5,590,285 A | 12/1996 | Krause et al. |
| 5,606,551 A | 2/1997 | Kartalopoulos |
| 5,606,595 A | 2/1997 | Ejzak |
| 5,617,539 A | 4/1997 | Ludwig et al. |
| 5,627,971 A | 5/1997 | Miernik |
| 5,638,433 A | 6/1997 | Bubien, Jr. et al. |
| 5,654,962 A | 8/1997 | Rostoker et al. |
| 5,657,317 A | 8/1997 | Mahany et al. |
| 5,659,542 A | 8/1997 | Bell et al. |
| 5,675,573 A | 10/1997 | Karol et al. |
| 5,675,741 A | 10/1997 | Aggarwal et al. |
| 5,694,318 A | 12/1997 | Miller et al. |
| 5,712,907 A | 1/1998 | Wegner et al. |
| 5,742,587 A | 4/1998 | Zornig et al. |
| 5,742,646 A | 4/1998 | Woolley et al. |
| 5,754,739 A | 5/1998 | Goldberg |
| 5,777,986 A | 7/1998 | Grossman |
| 5,854,903 A | 12/1998 | Morrison et al. |
| 5,862,203 A | 1/1999 | Wulkan et al. |
| 5,892,754 A | 4/1999 | Kompella et al. |
| 5,898,668 A | 4/1999 | Shaffer |
| 5,940,372 A | 8/1999 | Bertin et al. |
| 5,953,312 A | 9/1999 | Crawley et al. |
| 5,953,319 A | 9/1999 | Dutta et al. |
| 5,966,658 A | 10/1999 | Kennedy, III et al. |
| 6,009,081 A | 12/1999 | Wheeler et al. |
| 6,011,804 A | 1/2000 | Bertin et al. |
| 6,023,529 A | 2/2000 | Ilan et al. |
| 6,034,946 A | 3/2000 | Roginsky et al. |
| 6,044,075 A | 3/2000 | Le Boudec et al. |
| 6,078,946 A | 6/2000 | Johnson |
| 6,097,703 A | 8/2000 | Larsen et al. |
| 6,151,324 A | 11/2000 | Belser et al. |
| 6,167,052 A | 12/2000 | McNeill et al. |
| 6,175,870 B1 | 1/2001 | Gawlick et al. |
| 6,275,470 B1 | 8/2001 | Ricciulli |
| 6,301,244 B1 | 10/2001 | Huang et al. |
| 6,314,093 B1 | 11/2001 | Mann et al. |
| 6,363,053 B1 | 3/2002 | Schuster et al. |
| 6,400,681 B1 | 6/2002 | Bertin et al. |
| 6,400,694 B1 | 6/2002 | Taniguchi |
| 6,516,192 B1 | 2/2003 | Spaur et al. |
| 6,665,702 B1 | 12/2003 | Zisapel et al. |
| 6,690,649 B1 | 2/2004 | Shimada |
| 6,775,280 B1 | 8/2004 | Ma et al. |
| 6,912,222 B1 | 6/2005 | Wheeler et al. |
| 6,981,055 B1 | 12/2005 | Ahuja et al. |
| 7,035,938 B2 | 4/2006 | Lau |
| 7,080,161 B2 | 7/2006 | Leddy et al. |
| 7,133,365 B2 | 11/2006 | Klinker et al. |
| 7,222,190 B2 | 5/2007 | Klinker et al. |
| 7,269,157 B2 | 9/2007 | Klinker et al. |
| 7,349,994 B2 | 3/2008 | Balonado et al. |
| 7,363,367 B2 | 4/2008 | Lloyd et al. |
| 7,406,539 B2 | 7/2008 | Baldonado et al. |
| 7,447,153 B2 | 11/2008 | Klinker |
| 7,447,798 B2 | 11/2008 | Klinker |
| 7,490,144 B2 | 2/2009 | Carlson et al. |
| 7,555,542 B1 | 6/2009 | Ayers et al. |
| 7,561,517 B2 | 7/2009 | Klinker et al. |
| 7,584,298 B2 | 9/2009 | Klinker et al. |
| 7,606,160 B2 | 10/2009 | Klinker et al. |
| 7,668,966 B2 | 2/2010 | Klinker et al. |
| 7,739,327 B2 | 6/2010 | Mutton et al. |
| 8,125,911 B2 * | 2/2012 | Patel .................. H04L 12/5691 370/241 |
| 8,687,621 B2 * | 4/2014 | Shah ...................... H04L 45/00 370/255 |
| 2002/0039352 A1 | 4/2002 | El-Fekih et al. |
| 2002/0078223 A1 * | 6/2002 | Baldonado .............. H04L 43/00 709/232 |
| 2002/0105909 A1 | 8/2002 | Flanagan et al. |
| 2002/0145981 A1 * | 10/2002 | Klinker ............... H04L 12/5695 370/244 |
| 2002/0199016 A1 | 12/2002 | Freedman |
| 2003/0076840 A1 | 4/2003 | Rajagopal et al. |
| 2003/0079005 A1 | 4/2003 | Myers et al. |

(56) References Cited

U.S. PATENT DOCUMENTS

| | | | |
|---|---|---|---|
| 2003/0086422 A1* | 5/2003 | Klinker | H04L 29/06 370/389 |
| 2003/0133443 A1* | 7/2003 | Klinker | H04L 12/2602 370/353 |
| 2005/0091396 A1* | 4/2005 | Nilakantan | H04L 45/04 709/232 |
| 2005/0169280 A1* | 8/2005 | Hermsmeyer | H04J 3/1617 370/395.51 |
| 2005/0201274 A1* | 9/2005 | Guerin | H04L 41/065 370/217 |
| 2005/0201365 A1 | 9/2005 | Wheeler et al. | |
| 2006/0182034 A1* | 8/2006 | Klinker | H04L 12/2602 370/238 |
| 2008/0049746 A1* | 2/2008 | Morrill | H04L 12/6418 370/389 |
| 2009/0016331 A1* | 1/2009 | Shah | H04L 45/128 370/356 |
| 2009/0292824 A1 | 11/2009 | Marashi et al. | |
| 2010/0110891 A1* | 5/2010 | Shah | H04L 45/00 370/235 |
| 2010/0165859 A1 | 7/2010 | Carruzzo et al. | |
| 2010/0169719 A1 | 7/2010 | Carruzzo et al. | |
| 2010/0179973 A1 | 7/2010 | Carruzzo | |
| 2010/0309795 A1* | 12/2010 | Shah | H04L 45/00 370/252 |
| 2011/0032833 A1* | 2/2011 | Zhang | H04L 45/70 370/252 |
| 2012/0140636 A1 | 6/2012 | Resende et al. | |
| 2012/0147849 A1* | 6/2012 | Trung | H04W 36/0016 370/331 |
| 2012/0275309 A1 | 11/2012 | Jalil | |
| 2013/0107712 A1* | 5/2013 | Allan | H04L 45/24 370/235 |
| 2013/0151688 A1* | 6/2013 | Widjaja | G06F 9/5088 709/224 |
| 2014/0317276 A1* | 10/2014 | Tie | H04L 45/306 709/224 |
| 2014/0359092 A1* | 12/2014 | Middleton | G06F 9/541 709/221 |
| 2015/0023170 A1* | 1/2015 | Kakadia | H04L 41/0823 370/235 |
| 2015/0063158 A1* | 3/2015 | Nedeltchev | H04W 76/00 370/253 |
| 2015/0156035 A1* | 6/2015 | Foo | H04L 47/2441 370/392 |

FOREIGN PATENT DOCUMENTS

| | | |
|---|---|---|
| JP | H04-195446 | 7/1992 |
| WO | 02/33894 | 4/2002 |

OTHER PUBLICATIONS

Building Reliable Networks with the Border Gateway Protocol by Iljitsch van Beijnum, Sep. 2002, BGP: Chapter 6, Traffic Engineering.

An Overview of Routing Optimization for Internet Traffic Engineering, IEEE Communications—1st Quarter 2008, vol. 10, No. 1.

Internap Brochure—The Internap Network-Based Route Optimization Solutions: Executive Summary, Sep. 2005.

The Interaction of IGP Weight Optimization with BGP, by Selin Cerav-Erbas and Olivier Delcourt, Université catholique de Louvain, Belgium (2006).

Internap Brochure—The IntelliChoice Model for Both Cost and Performance, 2008.

Short: Self-Healing and Optimizing Routing Techniques for Mobile Ad Hoc Networks, by Chao Gui and Prasant Mohapatra, University of California, Davis, California 95616 (2003).

Optimizing Cost and Performance for Multihoming, by David Goldenberg, Haiyong Xie, Yang Richard Yang, Yale University; Lili Qui, Microsoft Research, and Yin Zhang, AT&T Labs-Research (2004).

Optimal Configuration for BGP Route Selection, IEEE Infocom 2003.

PCT International Search Report regarding Application No. PCT/US2014/058332 filed Sep. 30, 2014, a counterpart of U.S. Appl. No. 14/081,601.

PCT International Written Opinion regarding Application No. PCT/US2014/058332 filed Sep. 30, 2014, a counterpart of U.S. Appl. No. 14/081,601.

Kermani, Parviz et al., "A Tradeoff Study of Switching Systems in Computer Communication Networks", IEEE Transactions on Computers, vol. C-29, No. 12, published Dec. 1980, pp. 1052-1060.

Khanna, Atul et al., "The Revised ARPANET Routing Metric", BBN Communications Corporation, available at least as of 1989, pp. 45-56.

Cisco 2515 Router downloaded from www.Manualslib.com, available at least as early as the effective filing date.

Jacobson, Van et al., "Congestion Avoidance and Control", presented at SIGCOMM '88, dated Nov. 1988, pp. 1-25.

Labovitz, Craig, "Delayed Internet Routing Convergence", IEEE/ACM Transactions on Networking, vol. 9, No. 3, published Jun. 2001, pp. 293-306.

Albrightson, R. et al., "EIGRP—A Fast Routing Protocol based on Distance Vectors", Interop 94, published 1994, pp. 1-13.

Rutgers, Charles L. Hedrick, "An Introduction to IGRP", Cisco Systems, Inc., dated Aug. 22, 1991, updated Aug. 10, 2005, pp. NCT0005413-NCT0005433.

Oran, David, Editor, Digital Equipment Corp., "OSI IS-IS Intradomain Routing Protocol", available as of Feb. 1990, pp. NCT0007917-NCT0008073.

Garcia-Luna-Aceves, J.J., "Loop-Free Routing Using Diffusing Computations", IEEE/ACM Transactions on Networking, vol. 1, No. 1, published Feb. 1993, pp. 130-141.

McQuillan, John M. et al., "The New Routing Algorithm for the ARPANET", IEEE Transactions on Communications, vol. Com-28, No. 5, published May 1980, pp. 711-719.

Wang, Zheng et al., Quality-of-Service Routing for Supporting Multimedia Applications, IEEE Journal on Selected Areas in Communications, vol. 14, No. 7, published Sep. 1996, pp. 1228-1234.

Rekhter, Yakov et al., Editor, T.J. Watson Research Center IMG Corporation, RFC 1771, "A Border Gateway Protocol 4 (BGP-4)", published Mar. 1995, pp. 1-57.

Traina, Paul, Editor, Cisco Systems, RFC 1773, "Experience with the BGP-4 Protocol", published Mar. 1995, pp. 1-9.

Braden, R., Editor, USC/Information Sciences Institute, RFC 1122, "Requirements for Internet Hosts—Communication Layers", published Oct. 1989, pp. 1-116.

Callon, Ross W., Editor, Digital Equipment Corporation, RFC 1195, "Use of OSI IS-IS for Routing in TCP/IP and Dual Environments", published Dec. 1990, pp. 1-65.

Moy, John, Editor, Proteon, Inc., RFC 1245, "OSPF Protocol Analysis", published Jul. 1991, pp. 1-15.

Lougheed, Kirk, et al., Editor, Cisco Systems, RFC 1267, "A Border Gateway Protocol 3 (BGP-3)", published Oct. 1991, pp. 1-35.

Almquist, Philip, RFC 1349, "Type of Service in the Internet Protocol Suite", published Jul. 1992, pp. 1-28.

Apostolopoulos George et al., Editor, IBM—T.J. Watson Research Center, RFC 2676, "QoS Routing Mechanisms and OSPF Extensions", published Aug. 1999, pp. 1-43.

Baumann, Rainer et al., "A Survey on Routing Metrics", TIK Report 262, Computer Engineering and Networks Laboratory, published Feb. 10, 2007, pp. 1-53.

Lee, Whay C. et al., "Routing Subject to Quality of Service Constraints in Integrated Communication Networks", IEEE Network, published Jul./Aug. 1995, pp. 46-55.

U.S. Appl. No. 60/275,206, filed Mar. 3, 2001.

U.S. Appl. No. 60/241,450, filed Oct. 17, 2000.

\* cited by examiner

Table 0.1: given a set of autonomous systems and prefixes for, the table shows a feasible selection of next hop for each destination prefix

|     | PR1 | PR2 | PR3 | PR4 | PR5 |
|-----|-----|-----|-----|-----|-----|
| AS1 | -   | AS2 | AS3 | AS2 | AS3 |
| AS2 | AS1 | -   | AS3 | AS4 | AS4 |
| AS3 | AS1 | AS2 | -   | AS4 | AS5 |
| AS4 | AS2 | AS2 | AS3 | -   | AS5 |
| AS5 | AS3 | AS4 | AS3 | AS4 | -   |

Table 0.2: given a set of autonomous systems and prefixes, along with the next hop assignment, the table shows a hop count for each destination prefix

|     | PR1    | PR2    | PR3    | PR4    | PR5    |
|-----|--------|--------|--------|--------|--------|
| AS1 | - (0)  | AS2(1) | AS3(1) | AS2(2) | AS3(2) |
| AS2 | AS1(1) | - (0)  | AS3(1) | AS4(1) | AS4(2) |
| AS3 | AS1(1) | AS2(1) | - (0)  | AS4(1) | AS5(1) |
| AS4 | AS2(2) | AS2(1) | AS3(1) | - (0)  | AS5(1) |
| AS5 | AS3(2) | AS4(2) | AS3(1) | AS4(1) | - (0)  |

Table 0.3: given a set of autonomous systems and prefixes, along with the next hop assignment, and latency measures from FIG. 2, the table shows an example round trip time for each destination prefix

|     | PR1      | PR2      | PR3      | PR4      | PR5      |
|-----|----------|----------|----------|----------|----------|
| AS1 | - (0)    | AS2(10)  | AS3(10)  | AS2(20)  | AS3(20)  |
| AS2 | AS1(10)  | - 0      | AS3(10)  | AS4(10)  | AS4(20)  |
| AS3 | AS1(10)  | AS2(10)  | - (0)    | AS4(10)  | AS5(10)  |
| AS4 | AS2(20)  | AS2(10)  | AS3(10)  | - (0)    | AS5(10)  |
| AS5 | AS3(20)  | AS4(20)  | AS3(10)  | AS4(10)  | - (0)    |

Table 0.4: given a set of autonomous systems and prefixes, along with the next hop assignment, and latency measures from FIG. 4, the table shows an example round trip time for each destination prefix, where each hop takes 5, 10, or 15 milliseconds

|     | PR1      | PR2     | PR3     | PR4     | PR5     |
|-----|----------|---------|---------|---------|---------|
| AS1 | - (0)    | AS2(5)  | AS3(15) | AS2(10) | AS2(15) |
| AS2 | AS1(5)   | - 0     | AS3(10) | AS4(5)  | AS4(10) |
| AS3 | AS1(15)  | AS2(10) | - (0)   | AS4(10) | AS5(15) |
| AS4 | AS2(10)  | AS2(5)  | AS3(10) | - (0)   | AS5(5)  |

FIG. 4

ROUTING SYSTEM FOR INTERNET TRAFFIC

CROSS-REFERENCE TO RELATED APPLICATIONS

This application claims priority to U.S. provisional patent application Ser. No. 61/891,196 filed Oct. 15, 2013 by applicants Charles Bancroft II, et al., and entitled Routing System for Internet Traffic, the complete disclosure of which is hereby incorporated herein by reference.

BACKGROUND OF THE INVENTION

The present invention pertains generally to routing in interconnected networks, such as the Internet, and more particularly to traffic route selections for multi-homed (connected to two or more networks) locations like data centers (DC).

As part of the Digital Revolution, communication technologies have given rise to a wide range of online services for both individuals and organizations via the Internet and other interconnected networks. Network routing protocols play a critical role in those networks to effectively (but not necessarily efficiently) move traffic from any source to any destination. The core routing decisions on the Internet are made by the Border Gateway Protocol (BGP) as specified in the Internet Engineering Task Force Request for Comments (IETF RFC) 4271, which uses routing tables to determine reachability among autonomous systems and make route selections. BGP guarantees that the traffic will go through the shortest path route to reach its destination, however, it does not guarantee that the route is optimal in terms of performance (e.g. latency, loss, and other factors).

The BGP decision process, as described in Section 9.1 of the RFC, has an elaborate decision tree to determine the degree of preference for each reachable route. While the specification of preconfigured policy information is considered a local matter, for routes received from external peers, a metric called AS_PATH length is used as the key criterion for the route selection. As further specified in Section 9.1.2.2 'Breaking Ties (Phase 2)', BGP looks at several metrics when deciding a path to choose, AS_PATH, origin attribute, MULTI_EXIT_DISC, next hop cost, and so on, but does not make decisions based on actual path performance.

The AS_PATH counts how many networks a path crosses on its way to the end user. When BGP makes a decision based on the AS_PATH metric it is doing so blind to the actual performance of the paths. Thus, although BGP is the canonical standard for routing global Internet traffic, it is a less than optimal solution for routing traffic from multi-homed locations or data centers if performance is important.

SUMMARY OF THE INVENTION

Accordingly, the various methods and systems of the present invention determine an optimal solution, which incorporates cost, capacity, demand, performance, and utilization, to select a route (e.g. network service provider) for every routable network prefix under consideration.

According to one embodiment, the route optimization engine considers all prefixes of interest, as well performance characteristics, cost structures and relaxation in a deterministic computation of a global optimal solution to determine the best performance route for each prefix, rather than pairwise evaluation of route candidates triggered by a policy violation, or any other heuristic-based routing system.

The optimization engine may be based on a mathematical model, expressed in at least one embodiment, as a linear programming formulation that takes into consideration cost and performance, while satisfying minimum commitment constraints (i.e., 95th percentile or 95p) in a relaxed fashion to always select best routes for each flow of traffic (per prefix) among a plurality of alternative route carriers (e.g. network service providers). This formulation increases the granularity of the carriers availability to specific prefixes announced as BGP routing advertisements.

According to another embodiment of the invention a method if provided for routing computer network traffic from a multi-homed location to a plurality of routes wherein each route has a cost and capacity associated therewith. The method includes determining a traffic flow demand for each prefix in a network prefix set; gathering performance data for each prefix along each route; assigning a performance value to each prefix based upon the performance data; and determining in a computer a routing decision for each prefix, wherein each routing decision assigns one of the routes to one of the prefixes and each routing decision is based upon the traffic flow demand, performance values, and the cost and capacity associated with each route.

According to yet another embodiment, a method is provided for routing computer network traffic from a multi-homed location to a plurality of routes wherein each route has a cost and capacity associated therewith. The method includes determining a first, second, and third traffic flow demand for a first, second, and third prefix, respectively, in a network prefix set; gathering performance data for each of the first, second, and third prefixes along each of the plurality of routes; and making first, second, and third routing decisions in a computer for routing each of the first, second, and third prefixes, respectively, along one of the plurality of routes. Further, the first routing decision takes into account the first, second, and third flow demands, as well as the cost and the capacity of the plurality of routes; the second routing decision takes into account the first, second, and third flow demands, as well as the cost and the capacity of the plurality of routes; and the third routing decision takes into account the first, second, and third flow demands, as well as the cost and the capacity of the plurality of routes.

According to still another embodiment, a system is provided for routing computer network traffic from a multi-homed location to a plurality of routes wherein each route has a cost and capacity associated therewith. The system includes a traffic estimator, a performance evaluator, and a routing engine. The traffic estimator is adapted to determine a traffic flow demand for each prefix in a network prefix set. The performance evaluator is adapted to gather performance data for each prefix along each route. The routing engine is adapted determine a routing decision for each of the prefixes wherein each of the routing decisions assigns one of the routes to each prefix; and wherein each of the routing decisions is based upon the traffic flow demand, the performance data, and the cost and capacity associated with each route.

According to a further embodiment, a system for routing computer network traffic from a multi-homed location to a plurality of routes wherein each route has a cost and capacity associated therewith is provided. The system includes a traffic estimator, a performance evaluator, and a routing engine. The traffic estimator determines a traffic flow demand for a first, second, and third prefix in a set of network prefixes of interest. The performance evaluator gathers performance data for each of the first, second, and third prefixes along each of the plurality of routes. The routing engine makes first, second, and third routing decisions for routing each of the first, second, and third prefixes, respectively, along one of the plurality of routes. The first routing decision takes into account the first, second, and third flow demands, as well as the cost and the capacity of the plurality of routes; the second routing decision takes into account the first, second, and third flow demands, as well as the cost and the capacity of the plurality of routes; and the third routing decision takes into account the first, second, and third flow demands, as well as the cost and the capacity of the plurality of routes.

According to other embodiments, the routing decisions are made such that they maximize a total sum of said performance values for the network prefix set. The totality of the routing decisions may represent a deterministic solution to routing all the prefixes in the network prefix set in a manner that maximizes the total sum of the performance values.

In other embodiments, the system and/or method may use a linear programming technique to make routing decisions. When using linear programming, the system and/or method solves an objective function subject to a plurality of constraints wherein the plurality of constraints includes the capacity. The constraints may also include the cost. In still other embodiments, the plurality of constraints may include a minimum commitment level for each particular route, as well as a relaxation variable that is set by the user that corresponds to an amount of traffic that the user is willing to have exceed his or her minimum commitment levels. The relaxation variable allows a user to relax the minimum commitments to allow a specified variance.

The performance values may be determined from the performance data by assigning weights to a performance metrics, such as latency and loss. Such assignments may include normalizing the performance values.

According to still other embodiments, a user may input one or more route-specific constraints into the computer for one or more specific prefixes, and the routing engine will use those route-specific constraints when determining the routing decisions for each prefix in the network prefix set. The route-specific constraints may identify one or more specific routes that are to be used for one or more specific prefixes, or they may identify one or more specific routes that are to be avoided for one or more specific prefixes, or they may identify a mixture of specific routes—some of which are to be used and some of which are to be avoided for one or more prefixes.

In still other embodiments, the user may input a minimum commitment level into the system for each of the plurality of routes where the minimum commitment level identifies a level of traffic (e.g. network bandwidth) for each route above which additional charges are incurred. This minimum commitment level is then used by the routing engine when making each of the routing decisions. Still further, a user may input a first capacity relaxation value for a first one of the routes where the first capacity relaxation variable identifies an acceptable degree to which traffic routed to the first one of the routes may exceed the minimum commitment level for the first one of the routes. When a first capacity relaxation variable is input, the routing engine will then use an increased capacity for the first one of the routes when determining routing decisions for each of prefix wherein the increased capacity corresponds to the first capacity relaxation value. A user may also input additional capacity relaxation variables for other routes, and the routing engine will use all of the input capacity relaxation variables when determining the routing decisions.

In order to reduce the computational burden, some embodiments that use linear programming may break the linear programming process up into multiple iterations. For example, the system and/or method may use a first linear programming iteration to determine a first subset of the routing decisions corresponding to a first subset of the prefixes, and then use a second linear programming iteration to determine a second subset of the routing decisions corresponding to a second subset of the prefixes. In so doing, the second linear programming iteration will be based on a reduced capacity that accounts for the portion of the capacity that was consumed by the traffic flow demand of the first subset of prefixes. The number of iterations can, of course, be increased beyond two, where each iteration takes into account the capacity reductions and routing assignments that were made in all of the previous iterations.

In still other embodiments, the method and/or system repetitively and automatically updates the traffic flow demand for each prefix in the network prefix set; gathers updated performance data for each prefix along each route; and determines revised routing decisions for each the prefix, wherein each of the revised routing decisions is based upon the updated traffic flow demand, the updated performance data, and the cost and capacity associated with each route. Such repetition may take place at a variety of different rates. In one embodiment, such repetition takes place more than ten times an hour, including once every minute—or even faster—although it will be understood by those skilled in the art that faster or slower repetition rates may be used.

During any one or more of the repetitions, the method and/or system, a user may assign a revised performance value to a subset of the prefixes. The routing engine will then make revised routing decisions for each prefix that are based upon the revised performance value, as well as the traffic flow demand and the cost and capacity associated with each route.

After making the routing decisions, the routing engine forwards network packets along the plurality of routes in accordance with the routing decisions.

The system and method allow the user to adjust the set of constraints by specifying a variable to adjust a workable capacity of the provider link. A user may also assign relative weights to adjust normalized factors taken into consideration when determining a network provider performance per network prefix.

According to still another embodiment, a method and system is provided that transforms network latency measures into a normalized form that can be factored into any of the methods and systems described herein. The method and system may further transform loss measures into a normalized form that can be factored into any of the methods and systems described herein.

In still other embodiments, the system and/or method utilize a specialized constraint, often referred to as a shunt, such that any solution set S is required to route a specific prefix p' to a particular provider r' as the next hop.

When the system or method uses a linear programming formulation, the formulation may take into consideration performance measurements by way of performance per prefix per provider. The system and/or method may also provide a method to blend a specific set of path characteristics. Still further, the formulation not only is capable of using the performance as part of the objective function to be maximized, it is also able to incorporate costs and 95p as part of the constraints to be satisfied by the optimal solution.

The prior art notion of policy may be replaced in one or more of the embodiments by parameters used to adjust the relative weight of factors in the prefix performance by provider table that is referred to as the W table. This prefix performance table is the part of the objective function to maximize, whereas the capacity and utilization are considered as constraints to which the solution is subject. The routing engine also allows for specific routing policies by prefix to be applied to the solution.

According to still another embodiment, a method of routing computer network traffic from a multi-homed location to a plurality of routes wherein each route has a capacity and a minimum commitment level associated therewith is provided. The method includes receiving a latency weighting from a user that indicates an importance of routing traffic in a manner that reduces latencies. The method also includes receiving a price weighting from a user that indicates an importance of avoiding routing more traffic over a route than the route's minimum commitment level. Still further, the method includes determining a traffic flow demand for each prefix in a network prefix set and gathering performance data for each of the prefixes along each route. Finally, the method includes determining in a computer a routing decision for each prefix that takes into account the latency weighting and the price weighting. Each routing decision assigns one of the plurality of routes to each one of the prefixes, and the totality of the routing decisions routes the traffic such that overall prices and latencies of the traffic are optimized in accordance with the price and latency weightings.

In still another embodiment, a computer program is provided that is embodied in a non-transitory manner in a physical medium, and said computer program includes instructions executable by one or more processors. The instructions, when executed by the one or more processors, carry out any one or more of the functions described herein that are used in making traffic routing decisions.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 4 shows an illustrative feasible routing table for the example network of FIG. 1.

DETAILED DESCRIPTION OF THE EMBODIMENTS

Figure 1:
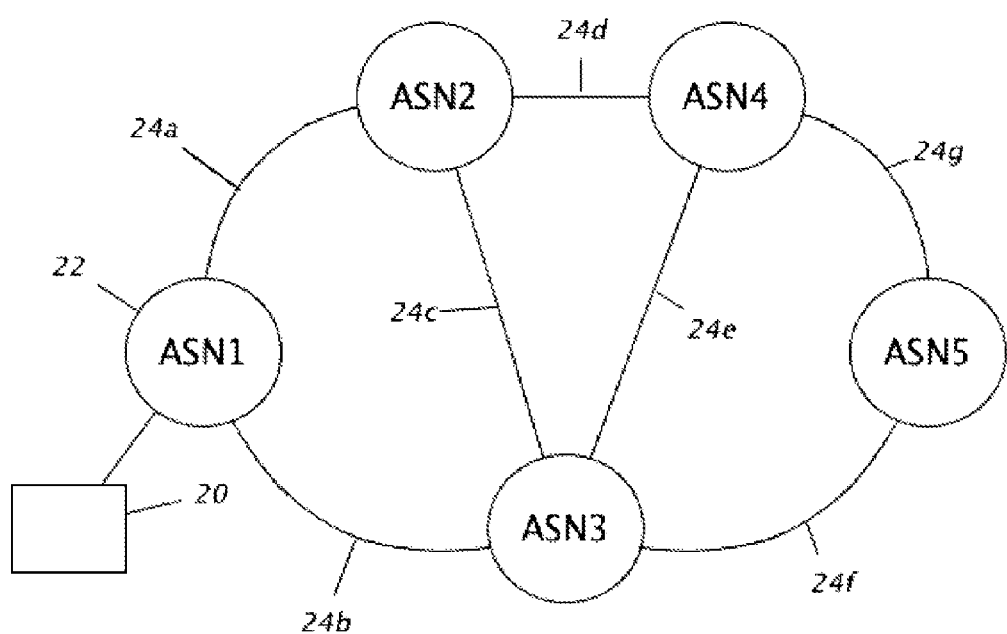
FIG. 1 is an example drawing showing a network of five autonomous systems, one of which incorporates a routing system according to one embodiment of the invention.
Figure 2:
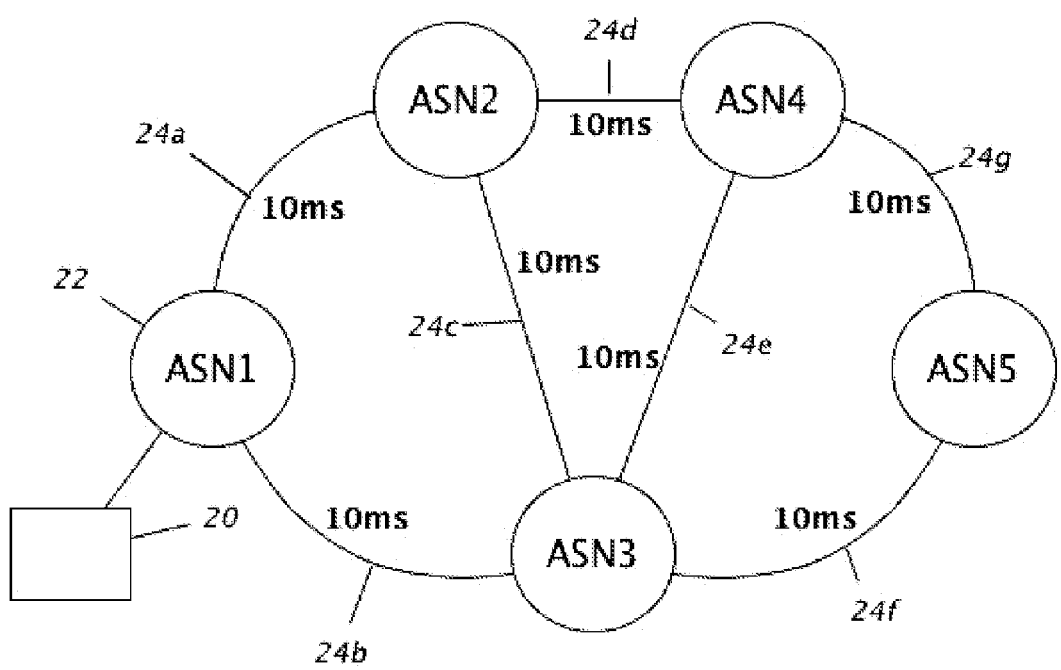
FIG. 2 is an example drawing showing the network of FIG. 1 with equal round trip time latency measures.
Figure 3:
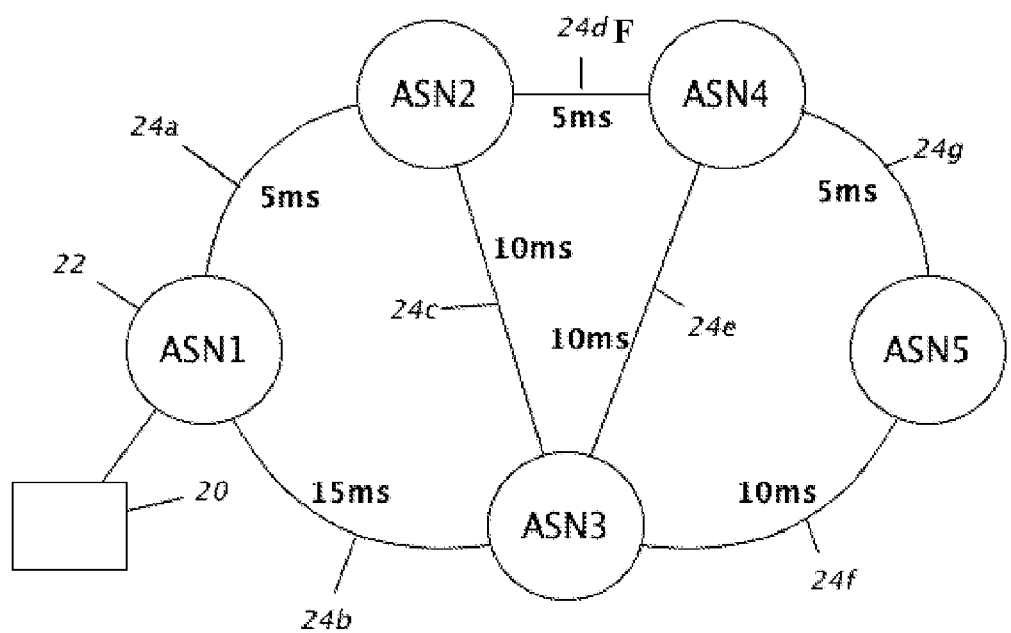
FIG. 3 is an example drawing showing the network of FIG. 1 with a different set of unequal round trip time latency measures.

The systems and methods of the present invention enable routing decisions to be automatically made for routing traffic from a multi-homed location in a manner that provides a global optimal solution for routing traffic (using metrics such as performance, cost, and other constraints), and which may use dynamic weight assignment for performance metrics, and a flexible problem definition to add routing rules (e.g. static and restricted routes) to the model. One example of such a routing system 20 is shown in FIG. 1.

Routing system 20 is located at a first multi-homed location 22 that is part of a first autonomous system AS1. As can be seen in FIG. 1, first autonomous system AS1 is connected via a first route 24a to a second autonomous system AS2 and via a second route 24b to a third autonomous system AS3. Second autonomous system AS2, in turn, is connected to third and fourth autonomous systems AS3 and AS4 via routes 24c and 24d, respectively. Third autonomous system AS3 is also connected via routes 24e and 24f to fourth and fifth autonomous systems AS4 and AS5, respectively. Finally, in the example shown in FIG. 1, fourth autonomous system AS4 is connected via route 24g to fifth autonomous system AS5. Such connections may be part of the Internet, or another type of network connection. Further, it will be understood that the example shown in FIG. 1 is merely an exemplary illustration and that the routing system 20 may be used with a variety of different network configurations. Indeed, routing system 20 may be used in any multi-homed location, regardless of whether or not such a location includes connections to two, three, four, or even more autonomous systems.

In overview, routing system 20 decides whether to route outgoing network traffic along route 24a to second autonomous system AS2 or along route 24b to third autonomous system AS3. If multi-homed location 22 were connected to more than these two routes 24a and 24b, then routing system 20 would be configured to decide whether to route such traffic along routes 24a, 24b, or one of the additional routes to which it had access.

Each route 24a, b, c, d, etc. has a physical capacity that limits the amount of network traffic that may be sent over that particular route. The physical capacities of each route 24a, b, c, etc. may be the same, or they may be different, depending upon the specific physical connections between the autonomous systems. Further, the entity that owns or operates first autonomous system AS1 will likely have contractual price agreements with autonomous systems AS2 and AS3 whereby AS1 has minimum commitment levels of traffic that may be sent over each of routes 24a and 24b. Exceeding these levels will typically result in additional charges for AS1. The prices for using routes 24a and 24b may therefore be the same or different from each other, as well as the charges for exceeding the minimum commitment levels.

Generally speaking, routing system 20 gathers information regarding the amount of traffic currently flowing to autonomous systems AS2 and AS3 along routes 24a and 24b. This information is gathered and sorted according to one or more network prefixes of interest. That is, the current traffic demand for each prefix of interest is gathered at location 22. Further, performance data is gathered for each network prefix of interest for the various destinations of interest. This performance data is gathered for both routes 24a and 24b (and would be gathered for additional routes if multi-homed location 22 were connected to additional routes 24). Routing system 20 then uses this traffic demand data, the performance data, the capacities of routes 24a and 24b, the minimum commitment levels corresponding to routes 24a and 24b, as well various information that may be input by a user into system 20, to calculate routing decisions for each of the network prefixes of interest. The routing decisions determine which route (24a or 24b) will be used for each network prefix of interest. In other words, for a given prefix, the routing decision will decide whether that traffic will be routed over route 24a or 24b. One possible manner in which routing system 20 accomplishes this, as well as various other features of the system 20, is described in greater detail below.

In one embodiment, routing system 20 uses linear programming to make the routing decisions for each prefix of interest. Linear programming is a mathematical methodology for determining values to achieve the best outcome in a given mathematical model given a list of constrains as linear inequalities and equalities. The best outcome is achieved by maximizing or minimizing a function called the objective function.

A linear programming problem is defined as follows.

$$\max f(x) \qquad (1)$$

$$\text{such that: } g_i(x) \leq y, \ 1 \leq i \leq n \qquad (2)$$

$$h_j(x) \geq 0, \ 1 \leq j \leq m \qquad (3)$$

Equation (1) is the objective function, and the inequality constraint set is represented by equations (2) and (3).

There are different well-known algorithms to solve linear programming problems including the Simplex algorithm, the Primal-dual algorithm, and the Ellipsoid algorithm among others. The standard algorithm for solving linear programming problems is the Simplex Algorithm, which is not guaranteed to run in polynomial time, but in general the algorithm runs fast (polynomial-time average-case complexity). There are many commercial and non-commercial linear programming packages to solve these kinds of problems, such as CPLEX by IBM (see www.cplex.com), the GNU Linear Programming Kit (GLKP) (see www.gnu.org/softwarefglpk/), and others, any of which can be used with routing system 20 to solve the route optimization problem confronted by system 20.

As noted, system 20 acts to solve the prefix/NSP (network service provider) selection problem for outbound traffic. For any data center or multi-homed location, the prefix/NSP selection problem consists in choosing the best possible route (NSP) for each destination prefix in the network, based on one or multiple criteria like performance, cost, shortest path, and others.

In one embodiment, system 20 uses the following route optimization model to solve this problem. This route optimization model uses linear programming formulations to find optimal solutions to the prefix/NSP selection problem based on network performance and costs. This model uses the following variables and terminology.

Set of Prefixes P={ }.
Set of Providers (Routes) R={ }
Demand per Prefix D={ }
Capacity of the links to the providers C={ }
Minimum commit to the providers M={ }
Capacity relaxation variable θ
Capacity adjustment variable δ (must be negative)
Performance Prefix/Provider W
Solution S (Binary: 0 or 1)

The set of prefixes P includes all of the network prefixes that are of interest. System 20 is configurable by the user to allow the user to select which prefixes are of interest. In one embodiment, system 20 considers all external prefixes that are detected by system 20 to be of interest and therefore determines a routing solution for all of those prefixes. In other embodiments, the user can configure system 20 so that only a portion, or set, of the total prefixes are considered and processed by system 20. In one embodiment, the set of prefixes is automatically selected by system 20 based on the amount of traffic associated with the prefixes (e.g. prefixes with the most traffic are automatically selected, while prefixes with the least traffic are excluded from the set).

In another embodiment, system 20 includes a user interface that allows a user to configure the automatic selection of the prefixes for inclusion in set P. Such automatic selection can be based on one or more inputs supplied by the user. For example, a user might instruct system 20 to include in set P the top X percent of prefixes when those prefixes are ranked from highest to lowest in terms of the amount of traffic associated with each prefix. As yet another alternative, a user might instruct system 20 to include in set P the top Y prefixes when the prefixes are ranked from highest to lowest in terms of amount of traffic, and where the variable Y is an absolute number, as opposed to a percentage. As yet another example, the user interface can be configured to allow a user to manually identify prefixes for inclusion in, or exclusion from, the set P. In still another embodiment, system 20 is configured to allow any combination of one or more of the above-mentioned automatic and manual methods of determining the composition of set P.

It will further be understood that, when the composition of set P is defined to include only a portion of the prefixes currently passing through system 20, the composition of set P can be automatically updated periodically by system 20. That is, in one embodiment, system 20 periodically re-samples or re-measures the current (or a very recent) level of traffic associated with either all, or a portion, of the prefixes passing through system 20 and updates the traffic level measurements for these prefixes. These measurements lead to an updated ranking of the prefixes and, if the set P is defined based at least partially upon the ranking of prefix traffic, system 20 will update the composition of set P for future solutions of the objective function (see equation 4 below). Thus, for example, if system 20 is configured to optimize, say only the top X percent of the prefixes (ranked in terms of traffic volume), the composition of set P can be automatically and dynamically updated each time equation (4) is solved to account for changing traffic volumes associated with the prefixes. A user of system 20 therefore has virtually complete flexibility in defining what prefixes are of interest—and thus included in equation (4)—and if the definition of those prefixes of interest varies according to traffic volumes, system 20 can be configured to automatically update the composition of set P.

The set of providers or routes R identifies the total number of routes that are available at the multi-homed location 22 for system 20 to use. In the example of FIG. 1, system 20 has two available routes: 24a and 24b. The set R for this example would therefore include two elements: route 24a and route 24b. The set R will therefore depend upon the local environment in which system 20 is implemented and the infrastructure that is available at that particular location. Further, system 20 is configured to allow a user to update the set R to reflect any changes in the number of routes that are available at multi-homed location 22. Thus, for example, if a user of system 20 terminates a contract with an existing network service provider, or adds a connection to a new network service provider, R can be reduced or enlarged to reflect such changes. In one embodiment, such changes are implemented by a user through a user interface presented on a computer display of a computer that is itself carrying out one or more of the functions of system 20, or that is in communication with at least one such computer.

The demand per prefix D is a table that, as will be discussed in greater detail, is generated by a traffic estimator 26. In the mathematical model described herein, the D table includes a single column having as many rows as there are prefixes of interest. Each row identifies the amount of current traffic (or a very recent measurement of the traffic) for that particular prefix. Each element may be measured in any conventional manner, such as megabits per second, gigabits per second, etc.

The set C includes the capacities of each of the routes to which multi-homed location 22 has access. In the example of FIG. 1, set C includes the capacity of route 24a and the capacity of route 24b. These are values that are fixed by the configuration, set-up, and physical characteristics of each route 24. These values are also measured in any conventional manner, such as megabits per second, gigabits per second, etc. As will be discussed in greater detail below, these values are accounted for by routing system 20 so that any prescribed solution will not attempt to route a greater amount of traffic to a route than that route has capacity for. For example, if route 24a has a capacity of five gigabits per second, routing system 20 will ensure that its cumulative routing decisions do not direct more than five gigabits of traffic to route 24a.

The minimum commit set M identifies the minimum commitment levels that AS1 has contractually agreed to with autonomous systems AS2 and AS3 for routes 24a and 24b, respectively. The set M will therefore have as many elements as there are available routes. In the example of FIG. 1, the set M will have two elements, one for the minimum commit level of route 24a and one for the minimum commit level of route 24b. The minimum commit level generally specifies how much traffic autonomous system AS1 may transmit over each route (24a, 24b) without incurring additional charges. As will be discussed in greater detail below, system 20 is configured to allow a user to relax these minimum commit levels so that more traffic may be sent over each route than the minimum commit level, which may lead to additional charges. Conversely, if the user of system 20 does not wish to exceed his or her minimums, the user can configured system 20 so that there is no relaxation, and system 20 will therefore seek a routing solution that, to the extent possible, avoids any routing of traffic over the minimum commit levels in a manner that incurs additional charges. The minimum commitment level is also measurable in any conventional manner, such as megabits per second, gigabits per second, etc.

The capacity relaxation variable theta is the variable which a user sets in order to relax the minimum commitment levels, as discussed above. Thus, in the exemplary model provided herein, if the user does not want to exceed their minimum commit, the user would set theta equal to 0, which would result in the lowest cost because the routing system 20 would find a solution that, to the extent possible, avoided exceeding the customer's minimum commitments for each route. In some instances, if the total cumulative traffic flow to be routed exceeds the cumulative total of minimum commits, it may not be possible to avoid exceeding at least one route's minimum commit level, but system 20 will, when theta is set to zero, seek to avoid this to the extent possible. The user may set theta to different values for each route, or he or she may choose to relax each route the same amount. The theta variable may be measured in the same units as the minimum commitment (e.g. megabits per second, gigabits per second, etc.).

The delta variable refers to a capacity adjustment variable that is primarily used in situations where the linear programming problem is solved in iterations. Such an iterative technique for solving the linear programming problem may be especially useful where there are a large number of routes and/or prefixes. As but one example, if system 20 is positioned at a location, such as location 22 in FIG. 1, where there are five available routes (e.g. routes 24) and there are 100,000 prefixes of interest, system 20 may be configured to first solve the linear programming problem (i.e. solving the objective function of equation (4)) for the first ten thousand prefixes. Subsequently, system 20 may then solve the linear programming problem for the next ten thousand prefixes, and so on. When solving the linear programming problem in this manner, the delta variable accounts for the capacity of each route that has been consumed by the cumulative total of the previous iterations. In other words, if the first iteration solves the routing problem for the first ten thousand prefixes, the available capacity for the remaining 90,000 prefixes (in this example) will be reduced by the total demand for those first ten thousand prefixes whose solution has been determined. This reduction in available capacity due to previous routing solutions is accounted for by the delta variable, as will be clearer from the explanation that follows.

The W table has as many columns as there are routes and as many rows as there are prefixes of interest. In other words, the W table is the same size as the solution table S (discussed below). Each element in the W table is calculated in at least one embodiment in the manner defined in equation 8. Each element in the W table therefore provides an indication of the measured performance for a given prefix along a corresponding route. Thus, for example, in the system of FIG. 1, if there were ten thousand prefixes under consideration, the W table would have ten thousand rows and two columns (one column corresponding to route 24a and the other to route 24b). The element in the first row and first column would provide an indication of the performance of that corresponding prefix over that corresponding route.

In the model described herein, the elements of the W table are normalized and defined in a manner where higher values indicate better performance. Therefore, as can be seen in equation 4, the objective function is to maximize the sum of the product of the W and S tables. Such maximization ensures that a routing solution is found for all of the prefixes under consideration wherein the routing solution represents the most optimal global solution to routing those prefixes given the capacity constraints of the routes 24, the cost constraints associates with those routes, and any user-inputs (e.g. shunts, weighting of the performance values, etc.).

As will be discussed in greater detail below, the W table gives the user the ability to assign relative weights to different measurements of performance. In this manner, the user can decide the relative value of low latency, for example, and/or low loss. Further, the W table gives the user the ability to set these weight factors for individual prefixes and individual routes, or for groups of prefixes and/or groups of routes, if desired. In at least one embodiment, the values of the W table remain all the same for each iteration in which a solution to equation (4) is determined.

The solution table S is, in the model described herein, a table having as many rows as there are prefixes under consideration and as many columns as there available routes. Each element in the solution table will be either a zero or a one (see equation 7 below). Further, each row in the solution table S will have only a single one, with the rest of the elements being zero (see equation 5 below). The single one in a given row will identify the route over which that prefix is to be routed. The solution table S is calculated by the routing system 20, which then routes the corresponding prefixes in accordance with the data in solution table S. In those cases where the linear programming problem is broken down into smaller iterations, the solution table S will be reduced in size to correspond to the size of each iteration. The reduced solution tables S will still contain only 1's and 0's, and there will still only be a single 1 in any given row (which corresponds to the route assigned to that prefix). System 20 is configurable by a user such that, when desired, one or more solution items in S can be predefined by adding a shunt to specify if a prefix should or should not use a specific route (see equation 7 below).

The Linear Programming (LP) formulation used by system 20 may be represented as follows:

Objective Function:

$$\text{Maximize} \sum_{p \in P} \sum_{r \in R} W_r^p S_r^p \quad (4)$$

Subject to:

$$\sum_{r \in R} S_r^p = 1, \forall p \in P \quad (5)$$

$$\sum_{p \in P} \sum_{r \in R} D_p S_r^p \leq M_r + \theta_r + \delta_r \leq C_r \quad (6)$$

$$S_r^{p'} = x, \quad x = [0, 1] \quad (7)$$

Where:

$$W = \frac{p(\text{latency})\text{latencyN}() + p(\text{loss})\text{lossN}() + p(\text{others})\text{othersN}()}{p(\text{latency}) + p(\text{loss}) + p(\text{others})} \quad (8)$$

$$\text{latencyN}() = 1 - \frac{\text{floor}\left(\frac{\text{latency}}{\text{bucketsize}} \% \text{ bucketRange}\right)}{\text{totalBucket} - 1} \quad (9)$$

$$\text{latencyN}() = \frac{\text{max\_deviation} - \text{floor}\left(\frac{\text{latency} - \text{lowest\_latency}}{\text{bucketsize}}\right)}{\text{max\_deviation}} \quad (9a)$$

$$\text{latencyN}() = 1 - \text{loss (can alternatively use buckets)} \quad (10)$$

$$\text{othersN}() = \text{normalization of other possible variables} \quad (11)$$

$$\theta_r = \text{costN}() + \text{feasibility}() + \text{userRelaxation}() \leq C_r - M_r \quad (12)$$

$$\text{costN}() = (C_r - M_r) * (100\% - p(\text{cost})) \quad (13)$$

$$\text{feasibility}() = f(\text{price, demand, capacity}) \quad (14)$$

$$\text{userRelaxation}() = u, \text{ where } u \leq C_r - M_r - \text{costN}() - \text{feasibility}() \quad (15)$$

$$-M_r - \theta_r - \delta_r = \text{adjustment}() \leq 0 \quad (16)$$

$$\text{adjustment}() = \left(-\text{previous}\left(\sum_{p \in P} \sum_{r \in R} D_p S_r^p\right)\right) \text{ or } a, \text{ where } a \leq 0 \quad (17)$$

In the equations above, the variables having a capital N followed by parentheses refer to normalized variables. For example, latencyN( ) refers to a normalized value for latency and costN( ) refers to a normalized cost variable. In the equations above, the normalization is carried out such that higher values of the normalized variables represent more desirable characteristics, while lower values of the normalized variable represent less desirable characteristics. Thus, for example, if a normalized latency value for a prefix on a first route has a value of, say, 0.8, and if a normalized latency value for the same prefix on a second route has a value of, say, 0.1, this means that the prefix is traveling faster (with less latency) on the first route as compared to the second route. As another example, the price charged by an NSP for exceeding a minimum commitment on a given route will vary inversely with the normalized cost variable so that the normalized cost variable will be higher when the NSP charges less and lower when the NSP charges more.

The variables p(latency), p(loss), and p(others) in equation 8 refer to weighting variables that are settable by a user. Each of these variables can be set between 0 and 100% in this model. Thus, for example, if a user is especially interested in reducing latency but has not concerns for loss, he or she could set p(latency) equal to 100% and p(loss) equal to 0%. The user is also obviously free to choose different weightings. The p(others) variable, as well as its normalized value (othersN( )) is an optional component that may be set to zero, if no other considerations are of interest to a particular user, or it may be populated if other performance metrics are of interest.

For equations (4), (6), and (17), the multiplication of the tables will be understood as referring to the multiplication of each element in the first table by the corresponding element in the second table. Thus, for example, if the W table and the S table in equation (6) each had two rows and two columns for a total of four elements in each table (e.g. elements $w_{11}$, $w_{12}$, $w_{21}$, and $w_{22}$ for the W table; and elements $s_{11}$, $s_{12}$, $s_{21}$, and $s_{22}$ for the S table), then equation (6) is seeking to maximize the following sum: $(w_{11}*s_{11})+(w_{12}*s_{12})+(w_{21}*s_{21})+(w_{22}*s_{22})$.

Equations (9) and (9a) identify alternative manners in which latency measurements can be normalized. Consequently, system 20 can utilize either equation (9) or (9a), or still other manners of normalizing the latency measurements. Indeed, in some embodiments, the solution of equation (4) can be carried out without normalizing the latency measurements at all, although the lack of such normalization may lead to slower computation times, and hence slower solutions of the objective function.

In both equations (9) and (9a), the "bucketsize" variable is the size of the latencies that are grouped, and can be chosen or changed by the user. The "bucketsize" variable may be measured in fractions of a second, such as milliseconds, etc. and is selectable by the user of system 20. The % symbol in equation (9) refers to the modulo or modulus operation (the % symbol in equation (13), however, refers to a percentage). For both equations (9) and (9a), the term "floor" refers to the greatest integer function (e.g. the floor function of, say, 3.8 is equal to 3, the floor function of 5.553 equals 5, and so on). Still further, for both equations (9) and (9a), the "latency" used is the latency measured for each prefix of interest over each available route. Such measurements are performed by the performance curator 28, discussed in more detail below.

With respect to equation (9), the "totalbucket" variable refers to the total number of buckets that are to be considered, and the "bucketRange" variable refers to the entire range of latencies that are to be considered. More specifically, the "bucketRange" is equal to the product of the "bucketsize" and "totalbucket" variables. Thus, as but one illustrative example, if a bucket size of 20 milliseconds is chosen, and if there are a total of ten buckets that are going to be considered ("totalbucket"), then the range of latencies that will be considered is equal to 200 milliseconds ("bucketRange"=200 ms=20 ms/bucket*10 buckets). Other bucket sizes and numbers of buckets can, of course, be used. In one embodiment of system 20, a user interface is provided on a computer display that allows a user to change these variables, if desired. The user interface accepts the values input by a user and forwards them to one or more processors (e.g. microprocessors, microcontrollers, etc.) that carry out the solution of equation (4).

With respect to equation (9a), the variable "lowest latency" refers to the lowest measured latency for a given prefix among all available routes. Thus, for example, if a system 20 has six available routes, the "lowest latency" would be the latency value from these six routes (for that prefix) that had the smallest value. Consider, as an illustrative example, the case where the latencies of traffic having a specific prefix (call it prefix A for reference) were measured as follows: NSP1 (or route 1) latency=8 millisecond; NSP2=12 milliseconds; NSP3=15 milliseconds; NSP4=20 milliseconds; NSP5=20 milliseconds; and NSP6=120 milliseconds. In this example, the "lowest latency" value would be set equal to 8 milliseconds, which is the lowest latency for prefix A over all of the six available routes.

The variable "max_deviation" in equation (9a) refers to the maximum number of deviations away from the "lowest latency" that a user wishes to set the cutoff limit where any latencies exceeding that cutoff limit will be assigned a normalized latency value of zero. The cutoff limit will be equal to the bucketsize multiplied by the max_deviation value. Thus, using the measured latency examples identified above for six available routes (NSPs), table A below identifies the normalized latencies that would be calculated using equation (9a) in two different examples: the first example (shown in the third column) where the bucketsize is selected to be 20 milliseconds and the max_deviation is set to 4, and the second example (shown in the fourth column) where the bucketsize is selected to be 2 milliseconds and the max_deviation is selected to be 10.

As can be seen in the first example of table A, if the bucketsize is 20 ms and the max_deviation is 4, then any routes whose measured latency is 80 milliseconds (4*20 ms) or more above the lowest measured latency (8 ms for NSP1) will be assigned a normalized latency value ("latencyN( )") that is equal to zero. Similarly, as can be seen in the second example of table A, if the bucketsize is two milliseconds and the max_deviation is set to 10, then any routes whose measured latency is 20 milliseconds (10*2 ms) or more above the lowest measured latency (8 ms) will be assigned a normalized latency value that is equal to zero.

The set R of routes, or sometimes referred to as carriers or NSPs, for a multi-homed location 22 is specified in such a way as to allow the retrieval of attributes directly required by the formulation, or by systems supporting collection of information, or implementation of the computed routing solutions. For instance, each provider has an appropriately registered autonomous system number (ASN), as specified in IETF RFC 1930. System 20 includes communication links from the multi-homed location 22 to each provider provisioned on routing equipment at the location 22. Each of these links has a maximum capacity, based on the type of link. It is a common practice to set the usable capacity of the link lower to the actual capacity of the link to reserve 'head room' (additional reserved capacity for potential traffic bursting) for that link. These capacity settings are specified in such a way as to allow members of R to be used as terms to a capacity function $C_r$ that will return the capacity from the set C for a particular provider r. There is also a cost function, costN( ) that, given a p(cost) weight, will return a relaxation value in megabits per sec, or gigabits per sec., etc. per provider.

The example of FIG. 1 shows a network diagram of an example of a router configuration in connection with which the system 20 can be employed wherein edge/core and border routers are used. The NSPs are connected to the multi-homed location 22 at the core routers, and the customer circuits are terminated at the border routers.

The set of routable prefixes for each provider can be collected via several mechanisms, such as SNMP queries or listening to route announcements over BGP sessions. This network reachability information includes the list of autonomous systems that need to be traveled to reach some destination prefix, p in P. For example FIG. 1 shows five autonomous systems AS1 through AS5. As can be seen there are multiple paths from AS1 to AS5, such that any AS occurs in the path only once. Each path can be represented as a sequence of ASs, e.g. [AS1, AS3, AS5], or [AS1, AS2, AS3, AS5]. Some route selection methods use the shortest path, though it might not be the best path. The BGP protocol typically selects the shortest path, however local preferences can be used to alter the next hop selection. From the perspective of a multi-homed location 22 as AS1, the routing decision is to send the traffic destined for AS5 either to AS2 or AS3. For each prefix, there is a decision to select a next hop AS, as in the table in FIG. 4.

In order to select next hop routes, for the entire set of interesting prefixes, while satisfying the capacity constraints, there has to be an estimation of the load on the network, or D, demand per Prefix. In one embodiment, system 20 uses Netflow as exported from the routers to estimate the traffic per target prefix. Netflow is a Cisco systems product marketed by Cisco Systems of San Jose, Calif. In other embodiments, other commercially available products may be used instead of Netflow to determine demand per prefix, such as, but not limited to, IPFix (an IETF standard protocol for logging IP packets as they flow

TABLE A

| Routes for Prefix A | Measured Latency (msec.) | latencyN( ) using eq. 9a with bucketsize = 20 ms and max_deviation = 4 | latencyN( ) using eq. 9a with: bucketsize = 2 ms and max_deviation = 10 |
| --- | --- | --- | --- |
| NSP1 | 8 | 1 | 1 |
| NSP2 | 12 | 1 | 0.8 |
| NSP3 | 15 | 1 | 0.7 |
| NSP4 | 20 | 1 | 0.4 |
| NSP5 | 30 | 0.75 | 0 |
| NSP6 | 120 | 0 | 0 | through a router), SFlow (a technology for monitoring network devices made available through the sFlow.org consortium), or other products. Regardless of the specific product, the capacity C of the links to the carriers can be read from the routers directly using SNMP, though this value can be reduced by a user in at least one embodiment to provide some specifically configured headroom. The amount of headroom required for a link may depend on specifics of the network routing equipment, or even the link capacities for other carriers configured on a specific device.

The providers of network services set prices given a minimum amount of committed traffic, M. This commitment to provide data throughput is typically measured, tracked and billed on the 95th percentile. The commitment can be relaxed on a per provider basis using $\theta$. The $\theta$ variable can be used to allow more traffic on each provider. Consider the notion of cost percentage, p (cost), as it affects the use of data throughput commitments by the formulation. Where p(cost) approaches 100%, cost is increasingly important, eventually to the point where, $M_r$ is a strict limit, and $\theta_r=0$. Alternatively, where p(cost) tends to 0, cost is less of an object of interest, $M_r$ is not a strict limit, but rather $C_r$ is.

Equation (14), which is a user-specified function that is based upon price, demand, and capacity, is used by system 20 in situations where the demand exceeds the total minimum commitments. Thus, for example, if total traffic demand is currently measured at, say, 1.5 gigabits, and there are only two routes available, each with a minimum commitment of 500 megabits, then there would otherwise be no feasible solution to equation (4) without the feasibility adjustment of equation (12) because the solution would be attempting to force 1.5 gigabits of traffic through routes with only a 1 gigabit combined minimum commitment. Accordingly, the minimum commitments of at least one of these routes has to be relaxed by 500 megabits in order to ensure that there is a feasible solution. Alternatively, the minimum commitment of both routes can be relaxed in any combination that cumulatively adds 500 megabits to the available capacity. Equation (14) therefore ensures that the minimum commitments will be adjusted, to the extent necessary, to have enough bandwidth for the current amount of traffic.

The precise manner in which the feasibility adjustment is carried out may vary from embodiment to embodiment, but in at least one embodiment, the user of system 20 is able to manually configure the algorithm that system 20 uses to make feasibility adjustments. One potential algorithm is to look at how much the current traffic exceeds the minimum commitments, find the route with the lowest charges for exceeding the minimum commitment, and route all of the excess traffic to the lowest cost route (assuming it has the capacity for the entire excess traffic, and taking into account any headroom adjustments that system 20 has implemented for that route via the user relaxation variable u (see eq. (15)). If the lowest cost route does not have sufficient capacity to receive the entire excess traffic then whatever surplus traffic cannot be routed to this lowest cost route can be sent to the second lowest cost route. If there is still additional traffic, the next lowest cost route is chosen, and so on. In this manner, the excess traffic is routed such that financial charges are minimized. It will be understood by those skilled in the art that other algorithms for making feasibility adjustments can be used.

The computational complexity of individual linear programming algorithms is known to increase when the number of optimization element grows. In order to address large numbers of interesting prefixes, the total set P can be partitioned, and solved serially. Each successive run must take into account estimated link utilization from prior runs. The $\delta$ variable allows the adjustment of the capacities when running multiple iterations of the optimizer. Therefore, we can optimize premium customers before regular customers, or divide large problems into smaller subproblems. We can also use S to modify the capacities when the 95p calculations are greater than the minimum commits.

The notion of network performance to a specific destination prefix can be constructed as a blend of measurable characteristics, which must be taken across each provider to the multi-homed location. The primary characteristics of interest are temporal latency and packet loss, and other characteristics such as path length or geographic distance may be considered. Each characteristic is given a relative weight on the interval [0,1], for example p(latency), and the W table is taken as the sum of weighted characteristics, divided by the sum of the weights. In order to prevent characteristic measures with large cardinality domains from dominating the sum, each characteristic measure is normalized. Different normalization techniques may be used besides those listed in the above-identified equations. Use of discrete values for ranges of latencies can make the computation run significantly faster.

A solution is comprised of individual determinations such that, for each prefix p in P, there will be one and only one element in the row of the S table corresponding to that prefix that has the value 1 (the rest will be zero). The column having the single element 1 in it indicates the next hop r of R that is selected for that traffic (each column corresponds to a specific route). The use of BGP as the mechanism to implement the solution in the network equipment requires that only one next hop can be selected, thus S is a table of binary elements, and every row in the solution table will have only a single 1 such that every prefix is assigned only one route.

Equation (7) can be used to add necessary shunts. Shunts are routing rules to define static routes and also prevent the traffic from using unwanted routes (restricted routes). The benefit of using shunts is that one can force the optimization engine to always select a provider for a specific destination, as well as never select one or multiple providers for that destination. Thus, in the example of FIG. 1, if a user desired to shunt all traffic corresponding to, for example, prefix 192.168.2.0/24 to route 24a, then the user would input this information into routing system 20. Routing system 20 would then insert into the solution table S the element 1 in the column corresponding to route 24a and the row corresponding to prefix 192.168.2.0/24. Such shunting can be performed on more than one route and on more than one prefix.

Still further, the user is able to configure routing system 20 such that, instead of forcing certain prefixes to be routed along specific routes, the user can simply control routing system 20 such that certain routes are avoided for certain prefixes. In such a case, routing system 20 inserts into the solution table S the element 0 in the column(s) and row(s) corresponding to the route(s) which the selected prefixes are to avoid. Such shunting can be performed on more than one route and on more than one prefix if the value is 0, and more than one route and a single prefix if the value is 1. Still further, system 20 is configurable by the user such that the solution table S can be populated with both ones and zeros so that, for example, the user can specify that some prefixes are to avoid some route or routes, while other prefixes are to be assigned specific routes. When such user configurations are input into the solution table S, routing system 20 solves the linear programming problem without changing these user-input values. In other words, routing system 20 will determine all of the remaining non-manually populated entries in the solution table S subject to the given constraints.

Figure 5:
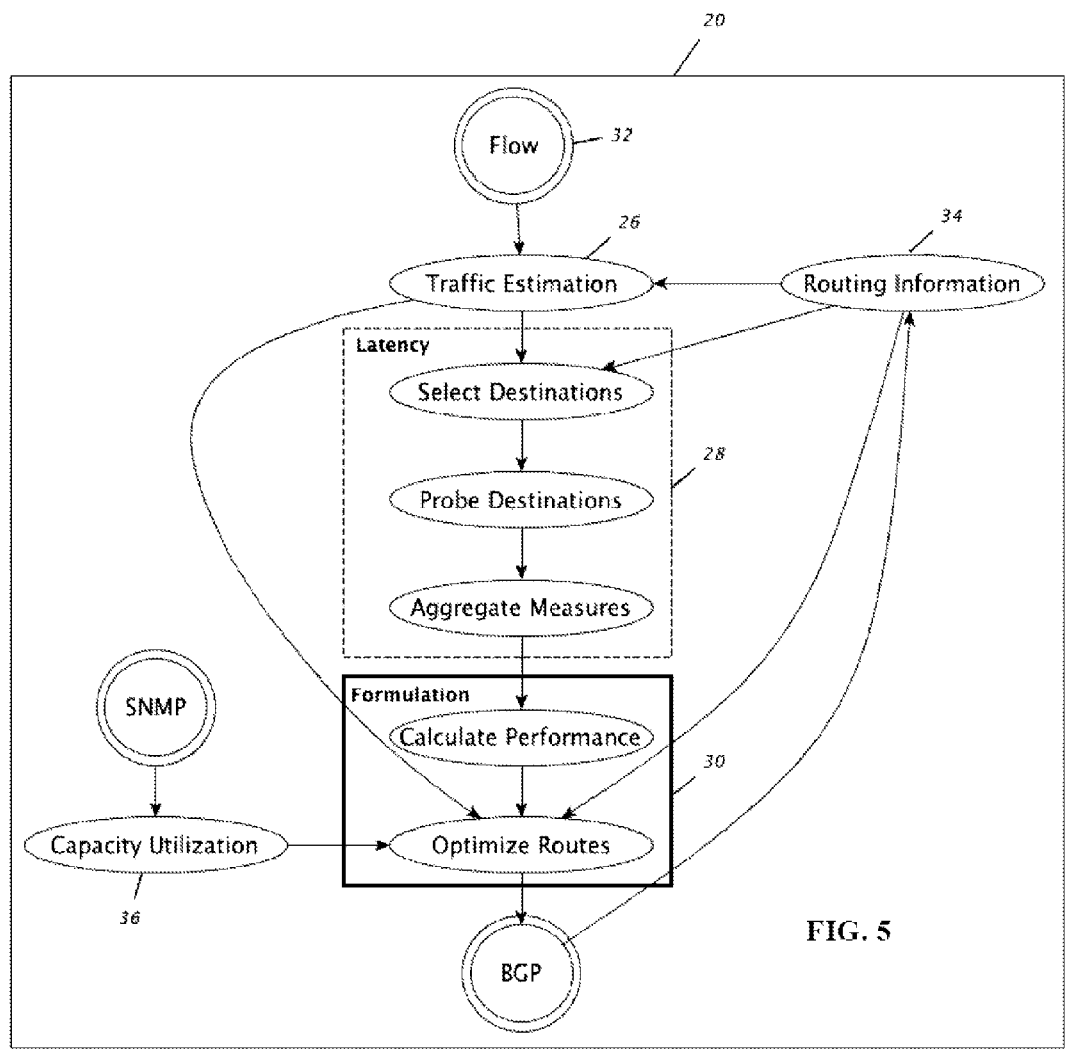
FIG. 5 is a block diagram illustrating one embodiment of the routing system, including data flow across various components of the system.

FIG. 5 illustrates one embodiment of routing system 20. As shown therein, routing system 20 includes traffic estimator 26, a performance curator 28, and a routing engine 30. The traffic estimator 26 receives flow data 32 from any conventional flow measuring platform, such as, but not limited to, the previously mentioned Netflow, IPFix, or SFlow products. Performance curator 28 also receives routing information 34 from one or more routers. Performance curator 28 uses the flow data 32 and the routing information 34 to select destinations and probe the selected destinations. The probing gathers performance data for the selected destinations and routes. Performance curator 28 then aggregates this data and forwards it to routing engine 30. In essence, performance curator 28 provides all of the raw performance data that is necessary to construct the W table and the demand set D. Performance curator 28 may be in digital communication with one or more routers associated with each of the available routes, and such communication may take place by way of one or more electrical, optical, or wireless connections, or any combination of these.

Routing engine 30 adjusts the performance data prior to constructing the W table. Specifically, the routing engine 30 normalizes the data generated from performance curator 30, and also adjusts the W table in accordance with the user-inputted weightings that are to be assigned to one or all of the prefixes and/or routes. The routing engine 30 also receives any user inputs regarding shunts, or routes to be avoided for specific prefixes. This information is inserted into the S table in the corresponding locations. Still further, the routing engine 30 receives capacity information 36 regarding the capacity of the available routes. Such capacity information may be gathered by simple Network Management Protocol (SNMP) communications, or by other means. Such capacity information is input into the corresponding constraints on the objective function (e.g. it is input into the components of the values of equation 6).

Thereafter, the routing engine 30 solves the linear programming problem (equation (4), subject to the constraints of equations (5)-(7)), which results in an S table identifying which route each prefix should be routed over. The routing engine 30 then implements the routing decisions using BGP as the mechanism. Routing engine 30 therefore is essentially using a snapshot of the traffic demand from a prior moment in time (input into the D table), as well as a snapshot of the performance (e.g. latencies, loss, etc.) of the traffic from a prior moment in time (and input into the W table in the manner specified by equations (8)-(11)), to compute an optimized routing solution—based on user preferences and/or user-assigned weightings—for routing traffic that thereafter passes through system 20. Because the traffic demand and performance data will change over time, system 20 will repetitively update its routing decisions by repetitively solving the objective function (equation (4)). Each time the objective function is to be solved, either a completely updated, or at least partially updated, set of data for populating the D, P, and W tables will be gathered. Further, to the extent a user adjusts any of the price or performance weightings, the user relaxation of the minimum commitment levels (u), or the headroom adjustment (δ) variable, system 20 will solve the objective function taking into account these user adjustments.

As was noted previously, in some situations it may be computationally advantageous to solve equation (4) iteratively. For example, suppose there were 100,000 prefixes of interest. Rather than trying to solve equation (4) a single time with 100,000 prefixes, a solution could be found by breaking the 100,000 prefixes up into smaller subsets and iteratively determining a solution for each subset. Thus, for example, if there were 100,000 prefixes of interest, equation (4) could be solved ten times using ten thousand prefixes in each iteration. After the first iteration of equation (4) is solved (e.g. 10,000 prefixes are assigned specific routes), the second iteration is adjusted by the delta variable to reduce the capacity in order to account for the traffic demand corresponding to the 10,000 prefixes whose routes were determined in the first iteration. Similarly, after the second iteration is solved, the third iteration will use a new delta variable that accounts for the capacity that was consumed by the 20,000 prefixes whose routes have now been assigned. This continues throughout the iterative process.

The iterative solution of equation (4) also allows a user of routing system 20 to give higher priority to premium customers, if desired. For example, if certain classes of customers are to be assigned higher priority, the prefixes associated with those higher value customers can be put through the first iteration of solving equation (4), while those customers that are considered to be of lesser priority will have their associated prefixes addressed in later iterations. To the extent some prefixes are associated with both higher priority and lower priority customers, those prefixes can be addressed in their order of traffic value, with higher volumes processed sooner than lower volumes, or they can be processed together with the higher priority customer prefixes, or based on some other factor. By finding routing solutions for the prefixes associated with higher priority customers sooner than one finds routing solutions for the prefixes associated with the lower priority customers, the prefixes associated with higher priority customers will tend to have better assigned routes.

In still other embodiments, the order in which prefixes are addressed in multiple iterations of equation (4) can be based on other factors, such as the traffic volume associated with each prefix. In other words, those prefixes having the greatest traffic volume associated with them would be run through the first iteration, and those with the second most volume would be run through the second iteration, and so on. Other ways of choosing the order of the prefixes through the multiple iterations of equation (4) can also be used.

It will also be understood by those skilled in the art that, when solving equation (4) iteratively, it is not necessary to wait for equation (4) to be completely solved before beginning to route traffic based upon the partial results obtained from the already-solved iteration(s). In other words, using the example above where there are 100,000 prefixes and equation (4) is solved ten times using 10,000 prefixes each time, once the first iteration of equation (4) is solved, routing of those 10,000 prefixes can begin immediately based upon the solution obtained for those 10,000 prefixes in that first iteration. That is, it is not necessary to wait until a solution is obtained for the remaining 90,000 prefixes before routing the 10,000 prefixes whose routes have been determined.

It will be understood by those skilled in the art that the various components of system 20 may be carried out by a single computer, or by multiple computers running different components that are in communication with each other, or by one or more different virtual machines that may be running on one or more different or common pieces of hardware. Thus, for example, performance curator 28 may be implemented on a first computer while routing engine 30 may be implemented on a second computer different from the first computer. Still other variations are possible. It will be understood by those skilled in the art that the term "computer," as used here, is used in its broadest sense to include not only general purpose computers (e.g. desktop computers, laptops, etc.), but also dedicated computers, as well as servers, routers, etc. and any aggregates or clusters of any of these devices, whether physically located together or geographically spaced apart. In at least some embodiments, system 20 is embodied as computer instructions stored in a non-transitory manner on a physical medium wherein the computer instructions, when executed by one or more processors, carry out the functions described herein.

Still further, it will be understood by those skilled in the art that the W table, as described herein, has been constructed such that higher values correspond to better levels of performance. It is also possible to use a performance table that provides an inverse manner of performance (i.e. degradation). When using values defined in this manner, the objective function is altered to minimize the product of the S and W table. Nevertheless, the solution is still to maximize the performance of the routing decisions because maximizing a sum of performance values is the same thing as minimizing a sum of degradation values.

It will also be understood that, although the solution table S has been described herein as being a table of binary values, where a one represents the route assigned for a given prefix and a zero represents the routes that are not to be used for the given prefix, the solution table S could be modified so as to have fractional values. When fractional values are used, the value represents the portion of the traffic associated with a given prefix that is to be routed over the corresponding route. Thus, for example, if the S table were to have the values 0.2, 0.3, 0.5, and 0 in the row corresponding to prefix B (an arbitrary prefix selected for this example), then twenty percent of the traffic associated with prefix B would be routed over the first route (corresponding to the first column of the S table); thirty percent of the traffic associated with prefix B would be routed over the second route (second column of S table); fifty percent of the traffic associated with prefix B would be routed over the third route; and no traffic associated with prefix B would be routed over the fourth route. Thus, instead of dictating only a single route for a given prefix, the S table can be modified to divide the traffic associated with a prefix over multiple routes. Carrying out the routing assignments included in an S table having fractional values is accomplished, in at least one embodiment, using a routing protocol other than BGP.

Various alterations and changes can be made to the above-described embodiments without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

What is claimed is:

1. A method of routing computer network traffic from a multi-homed location to a plurality of routes wherein each route has capacity associated therewith, said method comprising:
   determining a first, second, and third traffic flow demand for a first, second, and third prefix, respectively, in a network prefix set;
   gathering performance data for each of said first, second, and third prefixes along each of said plurality of routes;
   making first, second, and third routing decisions in a computer for routing each of said first, second, and third prefixes, respectively, along one of said plurality of routes,
said computer using a linear programming technique to make said first, second, and third routing decisions, said linear programming technique including solving an objective function subject to a plurality of constraints, wherein said plurality of constraints includes said capacity, as well as prices associated with said routes; wherein:
   said first routing decision takes into account said first, second, and third flow demands, as well as said capacity of said plurality of routes;
   said second routing decision takes into account said first, second, and third flow demands, as well as said capacity of said plurality of routes;
   said third routing decision takes into account said first, second, and third flow demands, as well as said capacity of said plurality of routes; and
   forwarding Internet Protocol (IP) packets along said plurality of routes in accordance with said first, second, and third routing decisions.

2. The method of claim 1 further including:
   determining a plurality of additional traffic flow demand for a plurality of additional prefixes in the network prefix set;
   gathering performance data for each of said plurality of additional prefixes along each of said plurality of routes;
   making a plurality of additional routing decisions in the computer for routing each of the plurality of additional prefixes along one of said plurality of routes, wherein:
   said first routing decision also takes into account said plurality of additional traffic flow demand;
   said second routing decision also takes into account said plurality of additional traffic flow demand;
   said third routing decision also takes into account said plurality of additional traffic flow demand; and
   said plurality of additional routing decisions each take into account said first, second, and third flow demands, as well as said capacity of said plurality of routes.

3. The method of claim 1 further including:
   inputting a route-specific constraint into said computer for a specific prefix, said route specific constraint identifying at least one route to be avoided or used for the specific prefix; and
   using said route-specific constraint when determining the first, second, and third routing decisions for each prefix in said network prefix set.

4. The method of claim 3 further including:
inputting a minimum commitment level into said computer for each of said plurality of routes, said minimum commitment level identifying a level of traffic for each route above which additional charges are incurred;
inputting a price weighting into said computer, said price weighting being indicative of an importance of routing traffic in a manner that reduces price;
inputting a capacity relaxation value into said computer for a first one of said routes, said capacity relaxation value identifying an acceptable degree to which traffic routed to said first one of said routes may exceed the minimum commitment level for said first one of said routes;
using said minimum commitment level and said price weighting when making each of said first, second, and third routing decisions; and
using an increased capacity for said first one of said routes when determining routing decisions for said first, second, and third prefixes, said increased capacity corresponding to said capacity relaxation value.

5. The method of claim 4 further including:
using a first linear programming iteration to determine said first routing decision;
subsequently using a second linear programming iteration to determine said second routing decision, wherein said second linear programming iteration is based on a first reduced capacity, said first reduced capacity accounting for an amount of the capacity consumed by the traffic flow demand of said first prefix; and
subsequently using a third linear programming iteration to determine said third routing decision, wherein said third linear programming iteration is based on a second reduced capacity, said second reduced capacity accounting for an amount of the capacity consumed by the traffic flow demand of said first and second prefixes.

6. A system for routing computer network traffic from a multi-homed location to a plurality of routes wherein each route has a capacity associated therewith, said system comprising:
memory;
a processor configured to execute instructions in the memory to carry out the following functions;
a traffic estimator adapted to determine a traffic flow demand for a first, second, and third prefix in a network prefix set;
a performance evaluator adapted to gather performance data for each of said first, second, and third prefixes along each of said plurality of routes;
a routing engine adapted to make first, second, and third routing decisions for routing each of said first, second, and third prefixes, respectively, along one of said plurality of routes, wherein:
said first routing decision takes into account said first, second, and third flow demands, as well as said capacity of said plurality of routes;
said second routing decision takes into account said first, second, and third flow demands, as well as said capacity of said plurality of routes;
said third routing decision takes into account said first, second, and third flow demands, as well as said capacity of said plurality of routes; and
wherein said routing engine performs the following:
(a) determines a performance value for each of said first, second, and third prefixes based upon said performance data, said performance values including a weighted sum of a latency metric and a loss metric;
(b) receives from a user a plurality of weights to be used in computing said weighted sum;
(c) determines a set of said first, second, and third routing decisions that maximizes a sum of said performance values;
(d) forwards Internet Protocol (IP) packets along said plurality of routes in accordance with said set of first, second, and third routing decisions; and
(e) uses a linear programming technique to make said first, second, and third routing decisions, wherein said linear programming technique includes solving an objective function subject to a plurality of constraints including said capacity of said plurality of routes, as well as prices associated with said routes.

7. The system of claim 6 wherein:
said traffic estimator determines a plurality of additional traffic flow demand for a plurality of additional prefixes in the network prefix set;
said performance evaluator gathers performance data for each of said plurality of additional prefixes along each of said plurality of routes; and
said routing engine makes a plurality of additional routing decisions for routing each of the plurality of additional prefixes along one of said plurality of routes; wherein:
said first routing decision also takes into account said plurality of additional traffic flow demand;
said second routing decision also takes into account said plurality of additional traffic flow demand;
said third routing decision also takes into account said plurality of additional traffic flow demand; and
said plurality of additional routing decisions each take into account said first, second, and third flow demands, as well as said capacity of said plurality of routes.

8. The system of claim 6 wherein said routing engine is adapted to receive a route-specific constraint for a specific prefix and use said route-specific constraint when determining the routing decisions for each prefix in said network prefix set, wherein said route-specific constraint identifies a specific route either be used or avoided for the specific prefix.

9. The system of claim 6 wherein said routing engine is configured to receive from a user a minimum commitment level for each of said plurality of routes, said minimum commitment level identifying a level of traffic for each route above which additional charges are incurred; and said routing engine is further adapted to receive a capacity relaxation value for a selected one of said routes, said capacity relaxation value identifying an acceptable degree to which traffic routed to said selected one of said routes may exceed the minimum commitment level for said selected one of said routes; and said routing engine being is further configured to use an increased capacity for said selected one of said routes when determining routing decisions for said first, second, and third prefixes, said increased capacity corresponding to said capacity relaxation value.

10. The system of claim 9 wherein:
said traffic estimator updates said traffic flow demand for said first, second, and third prefixes;
said performance evaluator updates performance data for said first, second, and third prefixes along each route; and
said routing engine determines a revised routing decision for each of said first, second, and third prefixes, wherein each of said revised routing decisions is based upon said updated traffic flow demand, said updated performance data, and the capacity associated with each route.

* * * * *